C. C. BLAKE.
ADHESIVE JOINT.
APPLICATION FILED SEPT. 4, 1915.

1,284,862.

Patented Nov. 12, 1918.

Inventor:
Charles C. Blake
by Charles F. McDermott
his attorney

UNITED STATES PATENT OFFICE.

CHARLES C. BLAKE, OF BROOKLINE, MASSACHUSETTS, ASSIGNOR TO C. C. BLAKE, INCORPORATED, OF BOSTON, MASSACHUSETTS, A CORPORATION OF NEW YORK.

ADHESIVE JOINT.

1,284,862.  Specification of Letters Patent.  Patented Nov. 12, 1918.

Application filed September 4, 1915. Serial No. 48,996.

*To all whom it may concern:*

Be it known that I, CHARLES C. BLAKE, a citizen of the United States, residing at Brookline, in the county of Norfolk and State of Massachusetts, have invented a new and useful Improvement in Adhesive Joints, of which the following is a specification.

The present invention relates to adhesive joints by means of which separate pieces of material are connected, and more particularly to adhesive joints which are used in the manufacture of boots and shoes for securing the lasted upper to the insole.

In the method of lasting shoes devised by me the updrawn upper is secured by cement to the edge face of the insole. To accomplish this operation the insole blank is first grooved along its edge and this groove is filled with jewelers' cement, sealing wax or some other of the well known adhesives which are normally non-adhesive under ordinary conditions of temperature but which are rendered tacky by heat. Embedded in this adhesive filling is a fine electric wire which has a heat-producing resistance. After the upper has been updrawn and held under pressure against the edge face of the insole a current of electricity is passed through the wire which becomes red hot thus melting the adhesive and thereby effecting the attachment of the lasted upper to the insole.

The object of the invention is to simplify and improve the method of preparing the insole for the joining operation by obviating the grooving of the edge of the insole to hold the adhesive and by effecting an economy in the use of the adhesive.

To the accomplishment of this object, and the production of a novel insole, the features of the present invention consist in certain methods, devices, combinations and arrangements of parts fully set forth hereinafter, the advantages of which will be readily understood by those skilled in the art.

The various features of the present invention will be readily understood from an inspection of the accompanying drawings, in which, Figure 1 is a plan of an insole on a last showing the manner in which the tubular fabric covered wire passes through an adhesive bath, is stripped of superfluous adhesive, and is secured to the edge face of the insole;

In the illustrated embodiment of the invention the member to be prepared for the joining operation comprises an insole 1 secured to the bottom of a last 2. The carrier for the adhesive comprises a tubular fabric cover 3 which incloses an electric wire 4 having a heat-producing resistance. The cover 3 is produced by braiding or weaving over the wire 4.

Figure 1:
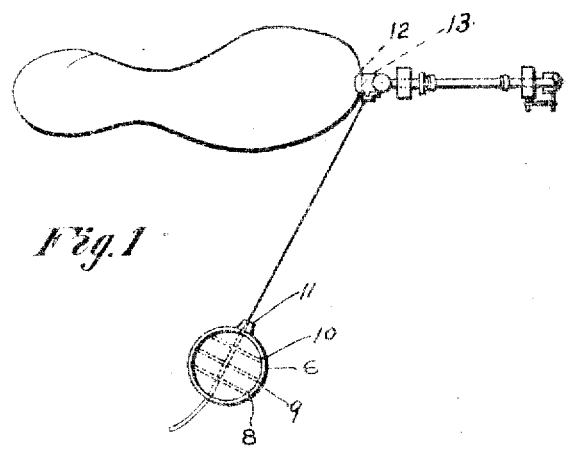
Figure 2:
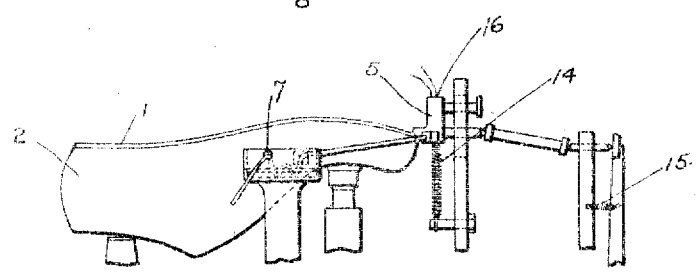
Fig. 2 is a side elevation.
Figure 3:
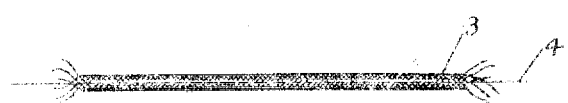
Fig. 3 is a detail showing the tubular fabric covered wire.

Preferably the last 2 is mounted to move longitudinally and rotate in order to transfer the point of operation of an attaching tool 5 along the edge face of the insole. As the last is fed the braid-covered wire is drawn from a suitable source of supply through an insulating adhesive bath 6 which is suitably heated to maintain the adhesive in a liquid condition. The braid-covered wire enters the bath through a hole 7 (Fig. 2), then passes under a grid 8 arranged beneath the surface of the adhesive, over a second grid 9, and beneath a third grid 10. The adhesive-covered braid then passes through a frusto-conical throat 11 which strips the braid of superfluous adhesive. The braid-covered wire is then led to the attaching tool 5.

The attaching tool 5 is provided with a lip 12 for engagement with the bottom of the insole on the last and with a lip 13 for engagement with the edge face of the insole. The lips 12 and 13 are held pressed against the bottom and edge face of the insole respectively by springs 14 and 15. The attaching tool 5 is slightly heated by an electric heater 16 to facilitate the attachment of the adhesive-coated braid to the edge face of the insole. The combination of heat and pressure on the tool 5 places the braid in a flattened condition upon the edge face of the insole.

With this method the insole is prepared for the lasting operation without a preliminary edge-grooving operation. Furthermore the braid carries the proper amount of adhesive to make a good joint between the upper and insole. Obviously an important economy in the manufacture of the type of welt shoes devised by me is effected.

While the illustrated embodiment of the present invention is directed to an improved method for preparing the insole of a welt shoe for the lasting operation it is not to be understood as limiting the scope of the claims, where the context otherwise permits, to the exclusive practice of this method in the manufacture of shoes, as it will be apparent to those skilled in this and other arts that the methods herein disclosed may be advantageously employed in preparing many kinds of materials for a joining operation.

What is claimed as new, is:—

1. That improvement in the art of preparing a member for a joining operation which consists in embedding a wire in a fabric cover, coating the fabric with an adhesive which is normally non-adhesive but which is rendered tacky under the influence of heat, and securing the coated fabric to the member, substantially as described.

2. That improvement in the art of preparing a member for a joining operation which consists in embedding a wire in a fabric cover, coating the fabric with an insulating adhesive which is normally non-adhesive but which is rendered tacky under the influence of heat, and securing the coated fabric to the member, substantially as described.

3. That improvement in the art of preparing a member for a joining operation which consists in braiding over a wire, coating the braid with an adhesive, and securing the coated braid under pressure to the member, substantially as described.

4. That improvement in the art of preparing a member for a joining operation which consists in embedding a wire in a braided cover, coating the fabric with an adhesive and securing the coated fabric under heat and pressure to the member, substantially as described.

5. That improvement in the art of preparing a member for a joining operation which consists in embedding a wire in a braided cover, passing the fabric through an adhesive bath, and securing the coated fabric to the member, substantially as described.

6. That improvement in the art of preparing a member for a joining operation which consists in embedding a wire in a braided cover, passing the fabric through an adhesive bath, stripping the fabric of superfluous adhesive, and securing the fabric to the member under heat and pressure, substantially as described.

7. That improvement in the art of preparing a member for a joining operation which consists in embedding in wire in a tubular fabric cover, coating the fabric with an adhesive which is normally non-adhesive but which is rendered tacky under the influence of heat, and securing the coated fabric to the member, substantially as described.

8. In combination, two members having interposed therebetween a fabric having an adhesive coating which is normally non-adhesive but which is rendered tacky under the influence of heat thereon and a thermal conductor therein, substantially as described.

9. A sole having a wire embedded in an adhesive-coated tubular fabric secured to the edge face thereof, substantially as described.

10. An assembled shoe, having, in combination, a sole and an upper having interposed therebetween a tubular fabric cover having an adhesive coating thereon and a wire therein, substantially as described.

11. In combination, two members having interposed therebetween a thermal conductor, covered with an adhesive-coated tubular fabric, said adhesive being normally non-adhesive but rendered tacky under the influence of heat, substantially as described.

12. In combination, two members having interposed therebetween a thermal conductor, having an adhesive-coated, flattened, tubular cover, said adhesive being normally non-adhesive but rendered tacky under the influence of heat, substantially as described.

13. In combination, two members having interposed therebetween a thermal conductor having an adhesive-coated, flattened, tubular, braided cover, said adhesive being normally non-adhesive but rendered tacky under the influence of heat, substantially as described.

CHARLES C. BLAKE.

It is hereby certified that in Letters Patent No. 1,284,862, granted November 12, 1918, upon the application of Charles C. Blake, of Brookline, Massachusetts, for an improvement in "Adhesive Joints," errors appear in the printed specification requiring correction as follows: Page 2, lines 36, 42, 48, claims 4, 5, and 6, for the word "braided" read *tubular fabric;* same page, line 56, claim 7, for the word "in" read *a;* and that the said Letters Patent should be read with these corrections therein that the same may conform to the record of the case in the Patent Office.

Signed and sealed this 11th day of March, A. D., 1919.

[SEAL.]

R. F. WHITEHEAD,
*Acting Commissioner of Patents.*

Cl. 36—12